United States Patent
Anderson et al.

(10) Patent No.: US 7,403,364 B2
(45) Date of Patent: Jul. 22, 2008

(54) POWER SYSTEM FAULT CHARACTERIZATION USING TRANSFORMED VALUES

(75) Inventors: Jason Scott Anderson, Raleigh, NC (US); Kevin L. Van Eyll, Angier, NC (US); Pasi Sakari Taimela, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/565,128

(22) Filed: Nov. 30, 2006

(65) Prior Publication Data

US 2008/0130182 A1    Jun. 5, 2008

(51) Int. Cl.
*H02H 3/00* (2006.01)
(52) U.S. Cl. .......................................... 361/79
(58) Field of Classification Search ................. 361/79, 361/47
See application file for complete search history.

(56) References Cited

U.S. PATENT DOCUMENTS

| | | | | |
|---|---|---|---|---|
| 4,745,512 A * | 5/1988 | Hampson | ...................... | 361/36 |
| 5,321,598 A * | 6/1994 | Moran | ......................... | 363/41 |
| 5,343,139 A * | 8/1994 | Gyugyi et al. | ............... | 323/207 |
| 5,677,832 A * | 10/1997 | Tissier et al. | ................... | 363/41 |
| 5,745,355 A | 4/1998 | Tracy et al. | | |
| 6,052,297 A * | 4/2000 | Akamatsu et al. | .............. | 363/84 |
| 6,862,199 B2 * | 3/2005 | Escobar et al. | ................ | 363/41 |
| 7,002,318 B1 * | 2/2006 | Schulz et al. | ................ | 318/782 |
| 2007/0005194 A1 * | 1/2007 | Chang et al. | ................. | 700/292 |

OTHER PUBLICATIONS

"Insulated Gate Bipolar Transistor," http://en.wikipedia.org/wiki/IGBT Nov. 2, 2006.

* cited by examiner

*Primary Examiner*—Michael J Sherry
*Assistant Examiner*—Christopher J Clark
(74) *Attorney, Agent, or Firm*—Myers Bigel Sibley & Sajovec (57) ABSTRACT

An apparatus can include a fault condition detector configured to detect a fault condition in an electrical system, a delta d-q power value generator configured to generate a delta d-q power value temporally corresponding to the detected fault condition, and a characterizer circuit configured to characterize the fault condition relative to the apparatus responsive to the delta d-q power value. Methods can include detecting a fault condition in an electrical system and determining changes in d-q component voltage and current temporally corresponding to the detected fault condition. Such methods can further include characterizing the fault condition responsive to the determined first and second changes and controlling an apparatus based on characterizing the fault condition.

20 Claims, 6 Drawing Sheets

| Description | dVq (V(N)-V(N-1)) | dIq (I(N)-I(N-1)) | dPq (dVq X dIq) | UV Detection | Result |
|---|---|---|---|---|---|
| Load Applied | - | + | - | FALSE | Remain Connected |
| Load Removed | + | - | - | FALSE | Remain Connected |
| Utility Removed | - | - | + | TRUE | Disconnect Source |
| Load Fault | - | + | - | TRUE | Remain Connected |
| Source Fault | - | - | + | TRUE | Disconnect Source |

POWER SYSTEM FAULT CHARACTERIZATION USING TRANSFORMED VALUES

BACKGROUND OF THE INVENTION

The present invention relates to electronic devices, and more particularly, to detecting faults in a power system.

Connecting two or more uninterruptible power supplies (UPS's) in a parallel redundant fashion can provide systems supporting higher and higher power availability. However, in order for a UPS to be able to operate in a redundant fashion with other UPS's, a robust "selective tripping" regime can be beneficial to provide system stability and functionality. As used herein, "selective tripping" refers to the set of hardware and/or associated software algorithms that can cause a failed UPS to trip off-line while the "good" parallel redundant unit(s) stay on-line. As will be appreciated by those skilled in the art, the redundant capability of a system can be limited by the effectiveness of its "selective tripping" regime.

UPS failures in a parallel redundant system include those that do not cause a disturbance on the critical output bus connected to the load, and those that do. The first kind of failure can be trivial since there is no disturbance on the critical bus. The good unit may not see the evidence of failure and may simply stay on-line doing its job. The failed unit may be simply off-line by virtue of its failure. However, the second kind of failure can be more problematic since all units may see the fault but any good units should stay on-line.

When a UPS fails in a way that the critical bus is disturbed, then it may be sourcing or sinking more current than can be absorbed or supplied by the other units that are on-line. Hence, all units may see the critical bus disturbance and all units may see excessive current. Yet, for selective tripping to work in this case, it is desirable that good units stay on-line and only the bad unit trip off-line. If a good unit trips off-line instead, then any benefit of redundancy for this type of failure can be lost.

Some previous parallel redundant power supply systems have used inter-unit signaling to facilitate selective tripping. For example, multiple uninterruptible power systems (UPS's) responsive to a three phase AC input voltage can be connected in a parallel redundant capacity configuration to provide a constant AC output voltage to a load. Each UPS can be connected to a DC voltage source (battery) in a conventional manner to provide constant power in the event of an AC power failure. Load sharing circuits can be associated with each UPS to facilitate inter-unit signaling and selective tripping using either a "difference from average" real time current signal on a "difference from average" bus, or a synchronizing signal provided on a synchronizing signal bus. Generally, if a fault is detected, the appropriate solid state or mechanical switch or relay can be thrown to remove the faulty UPS from the power circuit, thereby maintaining a constant AC output voltage on the load.

Using "difference from average" load sharing or common synchronization signal load sharing can be common practice. In the case of "difference from average" load sharing, for example, a real-time current signal can be used as an inter-unit signal amongst the parallel redundant UPSs. Unfortunately, the use of such inter-unit signaling can be vulnerable to interruption and hence should be redundant itself to provide a robust selective tripping regime. Since prior art systems can use inter-unit signaling for selective tripping, then there should be a redundant selective tripping scheme so that the inter-unit signaling itself does not become a single failure point of the otherwise redundant system.

Another common practice in the prior art can be to vectorially add the "difference from average" real-time current signal to the UPS's own voltage signal to create a biased voltage signal. This vector addition can be done in such a way that the "biased" voltage distortion on the failed unit is accentuated compared to the unbiased voltage while the same signal is less severe on the good unit(s). However, this method can require both signal comparison and logical processing to make the final determination of whether a unit is "good" or "bad". While this method is usually adequate, the response may be slow due to the weakness of the difference. Also, this method can also rely on externally derived information such as the "difference from average" signal. Such additional signaling and the additional internal circuits used by the prior art parallel redundant power systems for identifying a faulty unit have had an adverse impact on reliability.

Selective tripping without inter-unit signaling has been previously addressed by monitoring each system's respective power output and keeping a running average of its own performance, as discussed in U.S. Pat. No. 5,745,355. Although power monitoring without inter-unit signaling is accomplished, the data processing and storage requirements associated with such methods can be memory and processor intensive. A more efficient technique for identifying and "selectively tripping" a faulty unit is desired.

SUMMARY OF THE INVENTION

In some embodiments of the invention, an apparatus may include a d-q component transformer configured to generate a d-q voltage value from a plurality of phase voltage signals corresponding to phase voltages in a power system and to generate a d-q current value from a plurality of phase current signals corresponding to phase currents in the power system. The apparatus may also include a first voltage filter configured to generate a first voltage sample from the d-q voltage value, the first voltage sample corresponding to the d-q voltage value at a first point in time and a second voltage filter configured to generate a second voltage sample from the d-q voltage value, wherein the second voltage sample corresponds to the d-q voltage value at a second point in time that precedes the first point in time.

The apparatus can also include a first current filter configured to generate a first current sample from the d-q current value, the first current sample corresponding to the d-q current value at the first point in time and a second current filter configured to generate a second current sample from the d-q current value, wherein the second current sample corresponds to the d-q current value at the second point in time. Additionally, the apparatus may include a power value generator configured to generate a delta d-q power value from the first and second voltage samples and the first and second current samples and a fault detector configured to detect a fault condition in a power system by comparing the d-q voltage value to an under-voltage limit value. A characterizer circuit can be included that is configured to determine a characteristic of the fault condition responsive to the delta d-q power value such that a control circuit can control a power system component responsive to the characteristic of the fault condition.

In some embodiments, the power system component can be an uninterruptible power supply (UPS), wherein the control circuit disconnects a power source when the fault condition is on a source side of the apparatus, and wherein the control circuit does not react when the fault condition is on a load side of the apparatus.

In yet some embodiments, the characterizer circuit can determine a direction of a change in power flow based on the sign of the delta d-q power value, such that the direction of a change in power flow determines whether the fault condition is on a load side of the apparatus or on a source side of the apparatus.

In further embodiments, methods may include detecting a fault condition in an electrical system and determining changes in d-q component voltage and current temporally corresponding to the detected fault condition. Such methods can also include characterizing the fault condition responsive to the determined changes and controlling an apparatus based on characterizing the fault condition.

In some embodiments, the controlled apparatus can be an uninterruptible power supply configured to run in a bypass mode, wherein controlling can include disconnecting a power source and powering a load using an inverter when the fault condition is on a power source side of the apparatus and staying in bypass mode when the fault condition is on the load side of the apparatus. In yet other embodiments, the controlled apparatus can be a plurality of inverter circuits coupled in parallel to an electrical bus and controlling may comprise disconnecting one of the plurality of inverters from a load when the fault condition is on the inverter side of the electrical bus. In further embodiments, the controlled apparatus can be an electrical switching device and controlling may comprise changing the state of the electrical switching device responsive to a characteristic of the fault condition.

In some embodiments, determining changes in d-q component voltage and current includes performing a Park's transformation on the phase voltage values to generate the d-q component voltage, performing a Park's transformation on the phase current values to generate the d-q component current, filtering the d-q component voltage value to generate the change in the d-q component voltage; and filtering the d-q component current value to generate the change in the d-q component current.

In some embodiments, filtering the d-q component voltage value includes generating a first d-q voltage value corresponding to a first point in time, generating a second d-q voltage value corresponding to a second point in time and subtracting the first d-q voltage value from the second d-q voltage value, wherein filtering the d-q component current value includes generating a first d-q current value corresponding to the first point in time, generating a second d-q current value corresponding to the second point in time and subtracting the first d-q current value from the second d-q current value.

In further embodiments, characterizing the fault condition includes generating a delta d-q power value as the product of the changes in d-q component voltage and current, wherein if the delta d-q power value is negative then the fault condition is characterized as a load fault and if the delta d-q power value is positive then the fault condition is characterized as a power source fault.

In yet further embodiments, detecting a fault condition in an electrical system includes generating a d-q voltage value from phase voltage values and comparing the d-q voltage value to an under-voltage limit value, wherein if the d-q voltage value is less than the under-voltage limit value, a fault condition is detected.

In some embodiments, an apparatus can include a fault condition detector configured to detect a fault condition in an electrical system, a delta d-q power value generator configured to generate a delta d-q power value temporally corresponding to the detected fault condition, and a characterizer circuit configured to characterize the fault condition relative to the apparatus responsive to the delta d-q power value. In some embodiments, the apparatus can include a controller configured to control an electrical system device responsive to the character of the fault condition.

In some embodiments, the electrical system device can include an uninterruptible power supply, wherein the controller is further configured to change a power source responsive to the fault condition in a first direction in the electrical system relative of the apparatus and to maintain the power source responsive to the fault condition in a second direction in the electrical system relative of the apparatus.

In yet other embodiments, the electrical system device can include a plurality of inverter circuits coupled in parallel to an electrical bus, wherein the controller is further configured to disconnect one of the plurality of inverters from a load when the fault condition is on the inverter side of the electrical bus.

In some embodiments, the delta d-q power value generator includes a variable generator configured to generate respective d-q component voltage and current from phase voltage and current values and a delta circuit configured to generate a delta d-q voltage and a delta d-q current, wherein the delta d-q power value is the product of the delta d-q voltage and the delta d-q current.

In yet some embodiments, the apparatus can include means for filtering d-q voltage and current values.

In further embodiments, the characterizer circuit is configured to determine that the fault condition is on a power source side of the apparatus if the delta d-q power value is positive and that the fault condition is on a load side of the apparatus if the delta d-q power value is negative.

In yet further embodiments, the fault condition on the power source side includes a loss of power source.

In some embodiments, the fault condition detector includes a variable generator configured to generate a d-q component voltage from phase voltage values and a comparator configured to compare the d-q component voltage to an under-voltage limit value, wherein if the d-q component voltage is less than the under-voltage limit value, a fault condition is detected.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. As used herein the term "and/or" includes any and all combinations of one or more of the associated listed items. Like numbers refer to like elements throughout.

Figure 1:
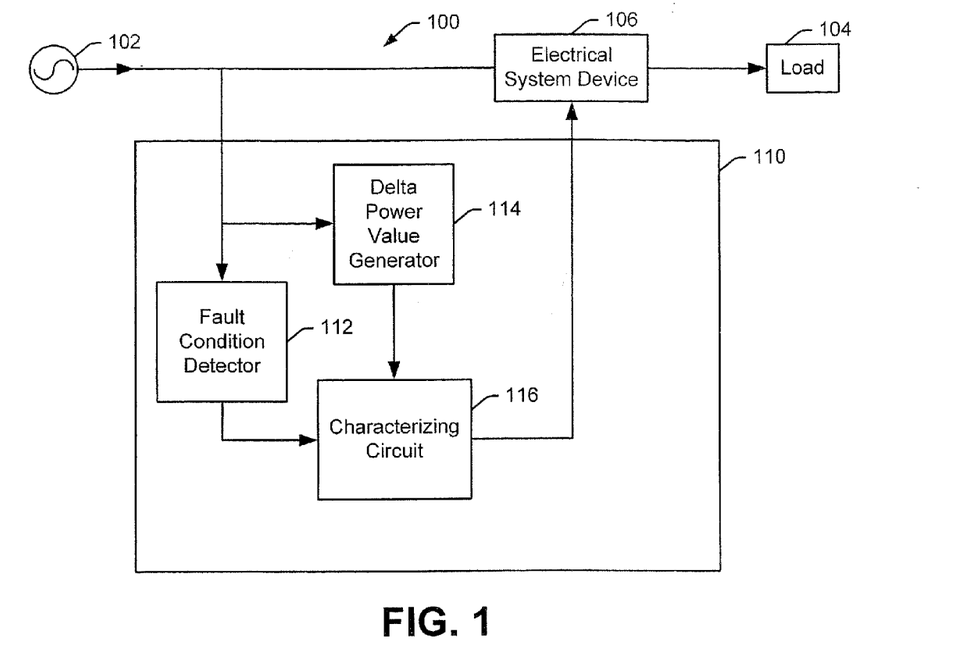
FIG. 1 is a block diagram illustrating an electrical system incorporating an apparatus according various embodiments of the invention.

Reference is now made to FIG. 1, which is a block diagram illustrating an electrical system 100 incorporating an apparatus according various embodiments of the invention. The system 100 includes an AC power source 102 connected to an electrical power load 104 via an electrical system device 106. The electrical system device 106 can be an uninterruptible power supply (UPS), a breaker, a power conditioning device, and/or an electrical switched device switch. An apparatus 110 that can monitor the power system 100 can include a fault condition detector 112 configured to detect a fault condition in the power system 100 based on, for example, a low voltage condition.

The apparatus 110 can also include a delta d-q power value generator 114 configured to determine the change in power flow that temporally corresponds to the fault condition. A characterizer circuit 116 can be used to determine the location of the fault condition relative to the apparatus 110 based on the delta d-q power value. For example, a positive delta d-q power value can indicate that the change in power flow is directed towards the source, such as in the case of a fault applied at or near the AC power source 102 relative to the electrical system device 106. The positive delta d-q power value can also occur upon the removal of the AC power source 102 from the electrical power system 100. Conversely, a negative delta d-q power value can indicate that the fault condition exists on the load side of the electrical system device 106. The characterizer circuit 116 can also provide a control signal to change a state of the electrical system device 106 responsive to the fault condition.

Figure 2:
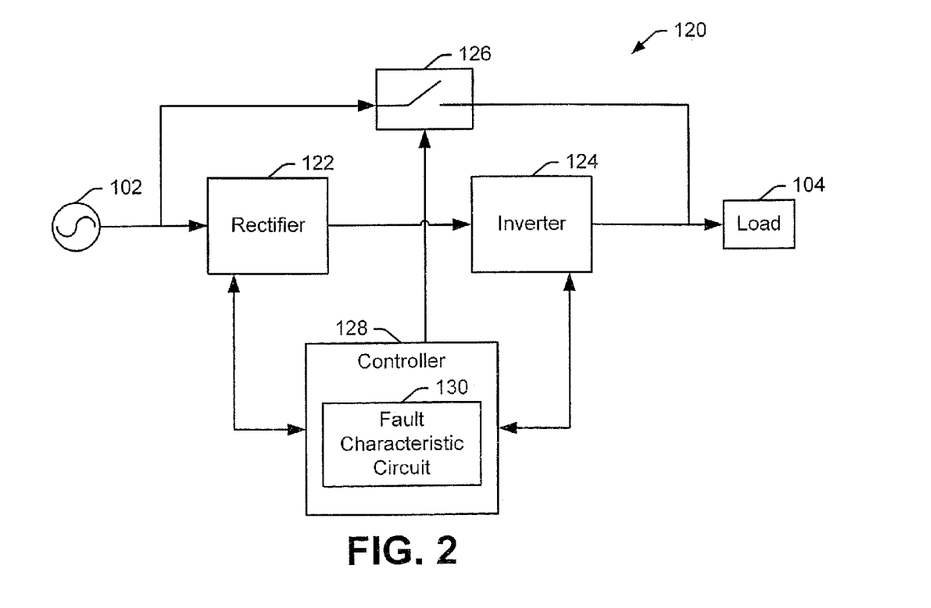
FIG. 2 is a block diagram illustrating a UPS incorporating a fault characteristic apparatus according to some embodiments of the invention.

Reference is now made to FIG. 2, which is a block diagram illustrating a UPS 120 according to various embodiments of the invention. The UPS 120 is connected between an AC power source 102 and a load 104. Although represented singularly, the source 102 and load 104 can also be source and/or load busses, respectively, configured to connect one or more sources and/or loads in parallel. The UPS 120 includes a bypass switch 126 that is configured to allow the load to be supplied directly by the source, bypassing the inverter and rectifier of the UPS circuits. The bypass circuit 126 may be used, for example, to power the load 104 directly from the source 102 when the rectifier 122 and/or the inverter 124 has failed. The bypass circuit 126 may also support high efficiency mode of operation, e.g., a mode wherein power is supplied via the bypass switch 126 while the rectifier 122 and/or inverter 124 provides power factor correction, harmonic suppression or other power conditioning. The bypass switch 126 can include, for example, silicon controlled rectifiers (SCR's) and/or power factor switching components.

The UPS 120 includes a rectifier 122 configured to convert AC electrical power to DC electrical power. In the case of a power loss or a source fault condition, the DC power can be supplied by a backup DC power supply, such as, for example, one or more battery cells selectively coupled to the DC power buss. The DC power can be received by an inverter 124, which converts the DC power to AC power for use by the load 104. A controller 128 provides and receives control information to and from the rectifier 122 and the inverter 124. The controller 128 includes a fault characterizer circuit 130 configured to characterize a detected fault condition. Responsive to the characterizer circuit 130, the controller 128 can selectively change the state of the bypass switch 126. For example, if the default mode uses the bypass switch 126 to commutate AC power from the source 102 to the load 104 and a fault condition occurs on the source side of the UPS 120, the controller 128 can signal the bypass switch to stop commutating the AC power thus triggering the inverter 124 to provide AC power. In some embodiments, each SCR in the bypass switch 126 can be individually fired based on utility zero crossings so that an immediate forward transfer of the load can be performed without waiting for the SCR's to commutate off. The individual firing can work in conjunction with power factor correction using the inverter such that the utility current and voltage are in phase. By utilizing the fault detection and characterization in combination with the individual SCR control and power factor correction, a transfer from bypass to inverter can be accomplished with a substantially zero-gap when a fault condition occurs at the source.

Alternatively, if the fault condition occurs on the load side of the UPS 120, the bypass switch 126 can continue to commutate AC power from the source 102 to the load 104. For example, in the case of a load side fault, bypass mode may be desirable when trying to clear a load breaker on one leg of the load so that other loads/legs may stay active since a shift to inverter power may risk exceeding the inverter current limits while trying to clear the load breaker. In this manner, the characteristic of the fault condition may be used to determine an appropriate system response.

Figure 3:
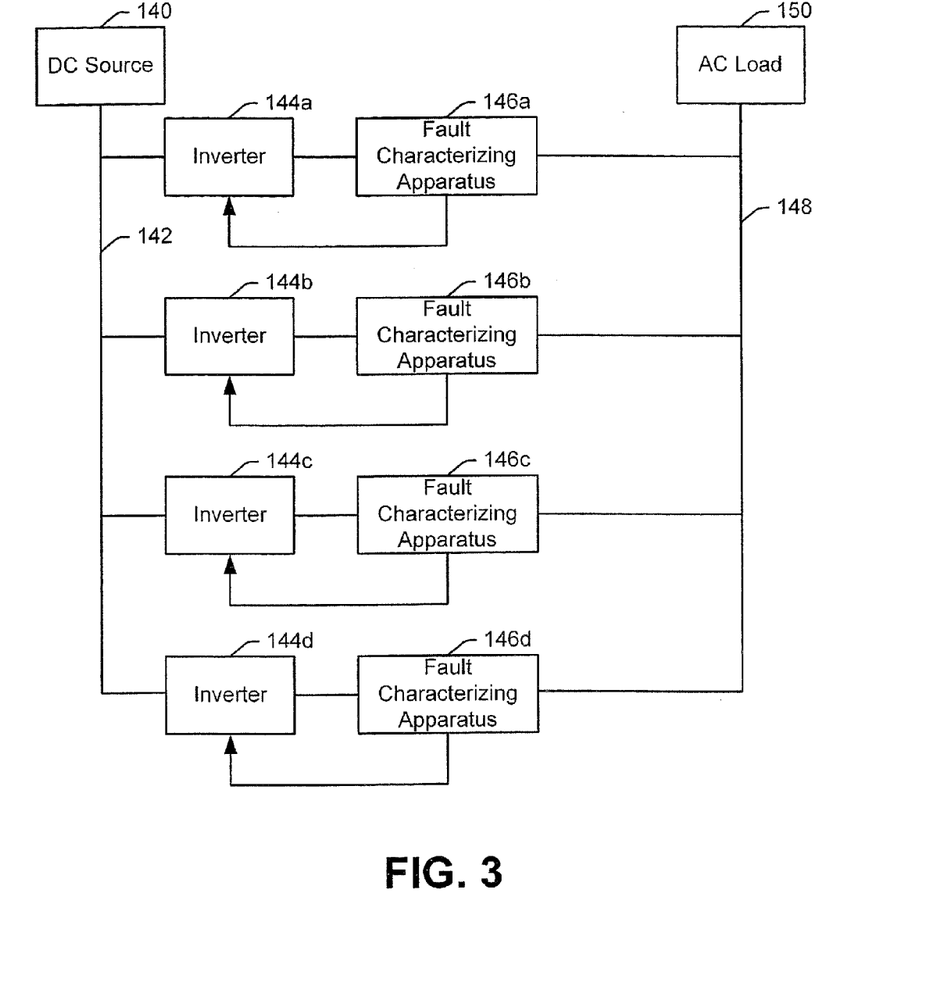
FIG. 3 is a block diagram illustrating a system having parallel inverters incorporating a fault characterizing apparatus according to some embodiments of the invention.

Reference is now made to FIG. 3, which is a block diagram illustrating a system having parallel inverters 144, each incorporating fault characterizing apparatus 146. Multiple parallel inverters 144a-d can be used in a variety of applications, including an inverter stage in a UPS, to provide power capacity and redundancy. By combining multiple parallel inverters 144a-d, for example, one of the units can fail and take itself offline and the remaining units can continue to provide the AC power. For example, assume that the inverter 144b experiences a fault condition, such as in internal short circuit, that results in an under-voltage condition on the AC buss 148. The fault characterizing apparatus 146b may determine that the fault condition is on the source side of the fault characterizing apparatus 146b and transmit a signal to inverter 144b to take itself offline. Under these conditions, the fault characterizing apparatus 146a that corresponds to functional inverter 144a will determine the fault to be on the load side of the fault characterizing apparatus 146a and the inverter 144a may remain connected and operational. In this manner, a faulted inverter 144b removes itself from the circuit while the operational inverters 144a, 144c, and 144d continue to provide power to the AC load 150.

Figure 4:
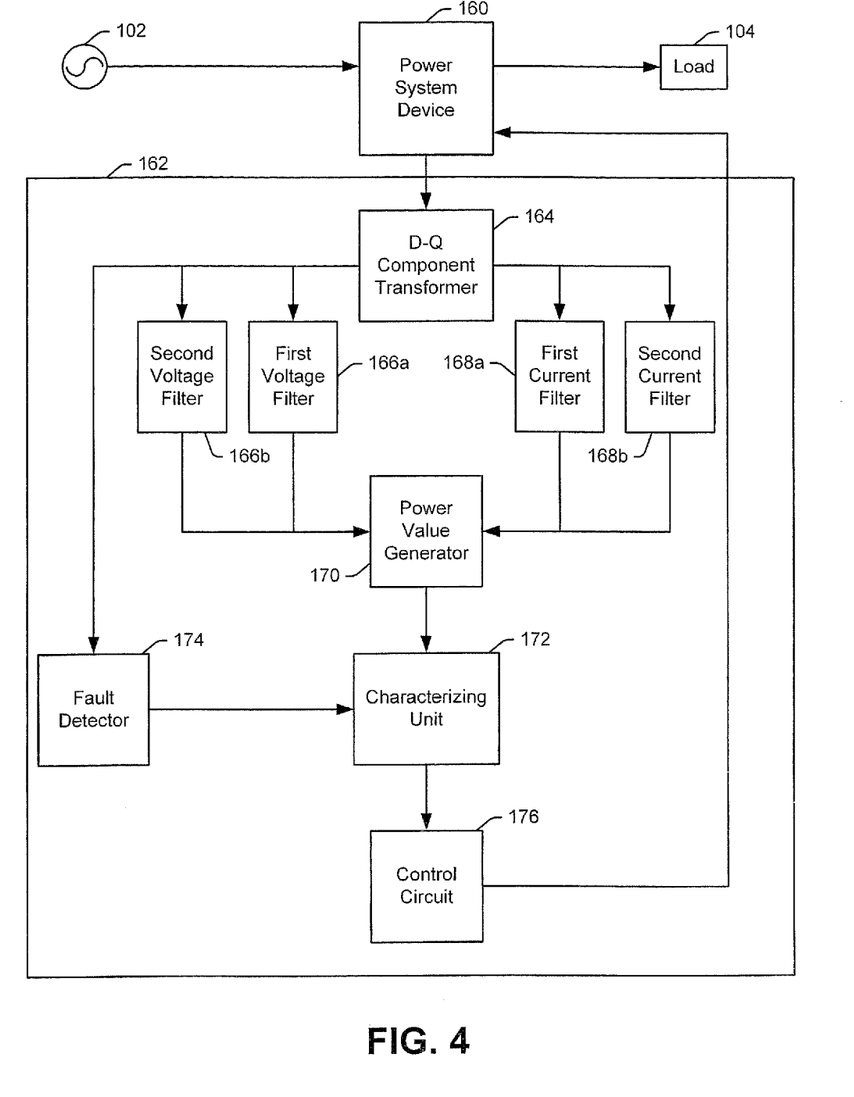
FIG. 4 is a block diagram illustrating a power system device using an apparatus according to various embodiments of the invention.

Reference is now made to FIG. 4, which is a block diagram illustrating a power system device using an apparatus for fault detection and characterization. The power system device 160 is coupled between an AC power source 102 and a load 104. The power system device 160 can include a virtually any power system device that is configured to between a source 102 and a load 104. For example, the power system device can be a UPS, switch, breaker, power conditioner, and/or monitor.

Similarly, in this context, a source can include a power generation device, utility electrical supply line, and/or a power transmission branch of an electrical distribution system. An apparatus 162 configured to detect and characterize fault conditions can include a d-q component transformer 164 configured to generate a d-q voltage value from phase voltage signals corresponding to the phase voltages in the power system and a d-q current value from phase current signals corresponding to phase currents in the power system. The d-q voltage and current values can be generated using, for example, a Park's transform. A Park's transform may generate both "d" and "q" components, which can represent real/active and reactive portions of the transform, respectively. The embodiments herein may utilize the "d" and/or the "q" components.

The d-q voltage value can be filtered by a first voltage filter 166a configured to perform a narrow filtering of the d-q voltage value to generate a value representative of a recent sample of the d-q voltage. The d-q voltage value can also be filtered by a second voltage filter 166b configured to perform a wider filtering of the d-q voltage value to generate a value representative of a less recent sample of the d-q voltage. Additionally, the d-q voltage value can be used by a fault detector 174 to detect a fault based on an under-voltage condition. For example, the d-q voltage value can be compared to an under-voltage limit value to detect an under-voltage condition that results from a fault condition.

The d-q current value can be filtered by a first current filter 168a configured to perform a narrow filtering of the d-q current value to generate a value representative of a recent sample of the d-q current. The d-q current value can also be filtered by a second current filter 168b configured to perform a wider filtering of the d-q current value to generate a value representative of a less recent sample of the d-q current.

The filtered d-q voltage and current values can be used by a power value generator 170 to generate a delta d-q power value. The delta d-q power value can be determined by multiplying a delta d-q current value with a delta d-q voltage value, which are determined as the difference between the first and second filtered current and voltage values, respectively. The delta d-q power value can be used, along with fault detection from the fault detector 174, by a characterizer 172 to determine the direction of the change in power flow temporally corresponding to a detected fault. For example, if the delta d-q power value is positive, then the change in power flow will be towards the source and indicate that either the source has been removed from the system or that there is a fault condition on the source side of the power system device 160. Conversely, if the delta d-q power value is negative, then the change in power flow will be towards the load indicating that a fault condition is located on the load side of the power system device 160.

The characterizer 172 can provide fault condition characterization to a control circuit 176, which can change a state of the power system device 160. For example, the state of a breaker or switch may be changed responsive to the characterization of the fault condition. Through the use of d-q values, data for a cycle or more of the AC waveform need not be stored, which may reduce storage requirements in comparison to convention techniques.

Figure 5:
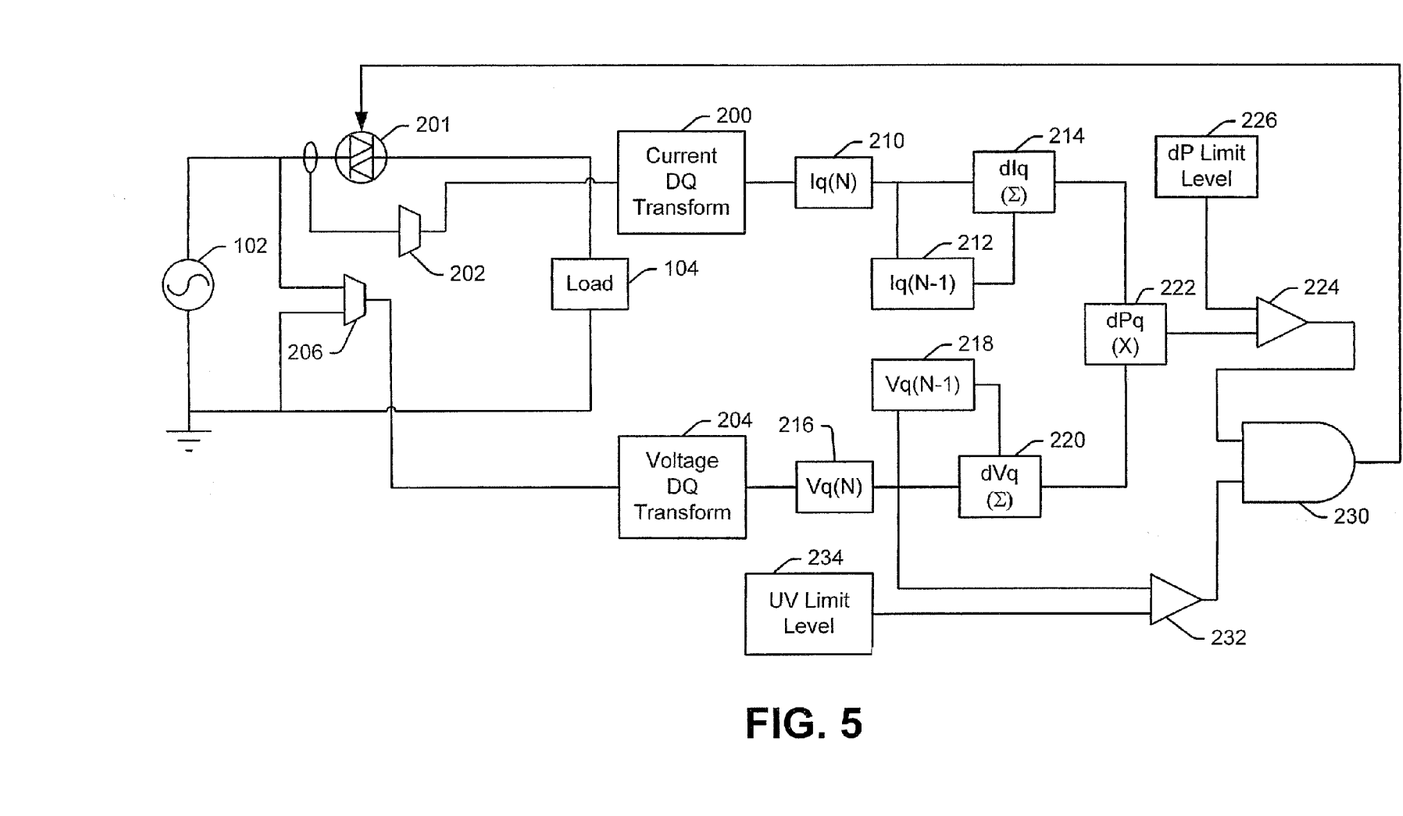
FIG. 5 is a schematic diagram illustrating functional blocks of apparatus/methods according to some embodiments of the invention.

Reference is now made to FIG. 5, which is a schematic diagram illustrating functional blocks of apparatus/methods according to various embodiments of the invention. A power source 102 is configured to be coupled to a load 104 through a switching device 201. A phase current signal is generated from a current measurement device 202 such as, for example, a current transformer. The phase current signal is transformed into a d-q current value by a current d-q transformer 200. The d-q current value is narrowly filtered in a first current filter 210 to generate an "N" d-q current sample. Additionally, a second current filter 212 is applied to the d-q current value to generate an "N−1" d-q current sample. A delta d-q current value is generated in a delta current operation 214 by taking the difference between the "N" d-q current sample and the "N−1" d-q current sample.

A phase voltage signal is generated from a voltage measurement device 206 such as, for example, a voltage or potential transformer. The phase voltage signal is transformed into a d-q voltage value by a voltage d-q transformer 204. The d-q voltage value is narrowly filtered in a first voltage filter 216 to generate an "N" d-q voltage sample. Additionally, a second voltage filter 218 is applied to the d-q voltage value to generate an "N−1" d-q voltage sample. A delta d-q voltage value is generated in a delta voltage operation 220 by taking the difference between the "N" d-q voltage sample and the "N−1" d-q voltage sample. Although represented as separate components, the first and second current and voltage filters of some embodiments can be implemented as one or more blocks and/or modules of code and/or logic. For example, a single module can be configured to provide the functionality of all of the first and second voltage and current filters by providing inputs that include the sampling criteria.

A delta d-q power value is generated as the product of the delta d-q voltage value and the delta d-q current value in a multiplier 222. The delta d-q power value can be compared with a delta power limit level value 226 in a power comparator 224 to generate a power flow indicator signal that is indicative of the direction of the change in power flow. For example, a change in power flow towards the source will provide a positive power flow indicator signal and a change in power flow towards the load will provide a negative power flow indicator signal. In this manner, the delta power limit level 226 can be set at zero, for example, such that the state of the output of the comparator 224 changes from a high/low logic value to a low/high logic value when the sign of the delta d-q power value changes. In some embodiments, the delta power limit level can be set to a value other than zero to reduce unwanted responses to normal fluctuations in the delta d-q power value and/or to trigger responses to other system conditions.

The "N" d-q voltage sample from the first voltage filter 216 and an under-voltage limit level 234 can be used by a voltage comparator 232 to generate a fault condition indicator signal. The fault condition indicator signal can be a binary value that provides one logical state for a TRUE fault condition and another logical state for a FALSE fault condition. The fault condition indicator signal and the power flow indicator signal can be received by a control gate 230 configured to provide a control signal responsive to a fault condition. Since the output of the control gate 230 is dependent on the value of the fault condition indicator signal, the control signal will not change states absent a detected fault. Even if a fault is detected, as indicated by the fault condition indicator signal, the control signal will only change states in the event that the power flow indicator signal indicates a source fault. As a general matter, the relative responsiveness and performance of the system can be adjusted by varying the characteristics of the various filters.

Figure 6:
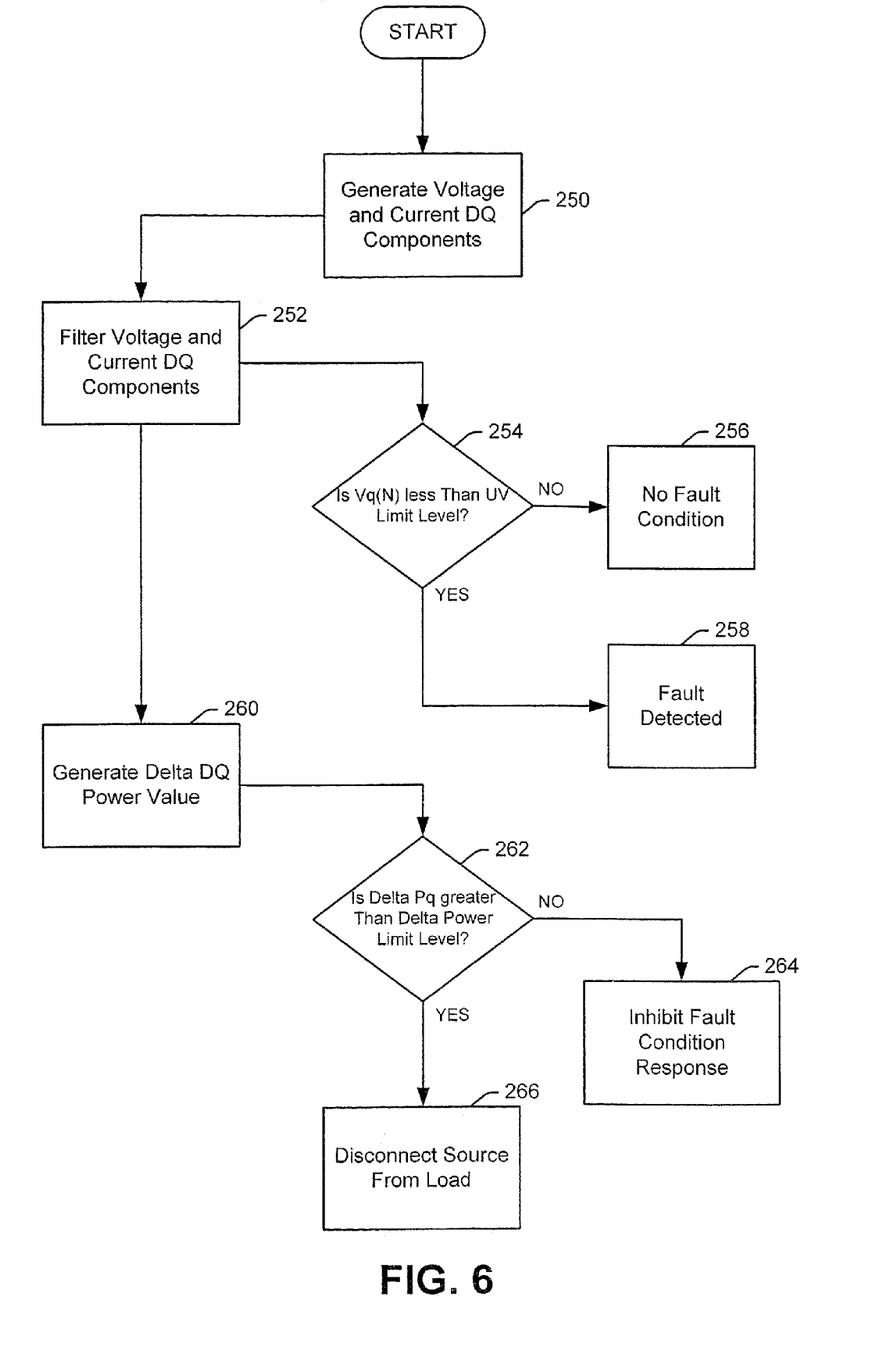
FIG. 6 is a flow diagram illustrating operations for characterizing faults according to various embodiments of the invention.

Reference is now made to FIG. 6, which is a flow diagram illustrating operations for characterizing faults according to various embodiments of the invention. Voltage and current d-q components are generated using, for example, a Park's transform as applied in hardware and/or software (block 250). The voltage and current d-q components are each filtered to provide first and second samples (block 252). The first and second samples can include an "N" and an "N−1" sample of both d-q voltage and d-q current. A fault condition is detected by comparing an "N" d-q voltage sample with an under-voltage limit level (block 254). If the "N" d-q voltage is not less than the under-voltage limit level then no fault condition exists (block 256). If the "N" d-q voltage is less than the under-voltage limit level then a fault condition exists (block 258).

The first and second voltage and current samples are also used to generate a delta d-q power value (block 260). The delta d-q power value can be generated as the product of a delta d-q voltage and a delta d-q current, which can each be determined as the difference between the first and second d-q voltage and d-q current samples, respectively. The delta d-q power value can be compared with a delta power limit level to determine the direction of the change in power flow corresponding to a fault condition (block 262). If the delta d-q power value is greater than the delta power limit level then the source can be disconnected from the load because the fault is on the source side of a system (block 266). If the delta d-q power value is not greater than the delta power limit level then a fault condition response is inhibited because the fault is on the load side of the system.

Figure 7:
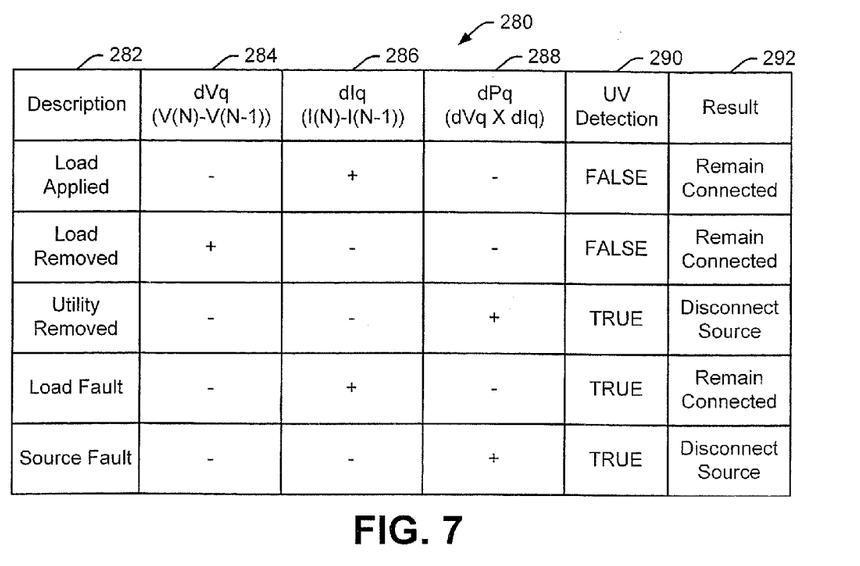
FIG. 7 is a table illustrating responses to different system states in a power system device using an apparatus according to various embodiments of the invention.

Reference is now made to FIG. 7, which is a table illustrating responses to different system states in accordance with operations/apparatus described herein. The table 280 includes a description column 282 that describes a variety of possible states in a power system. A dVq column 284 lists, for each of the states in the description column 284, the sign of the change in a d-q component voltage as determined by the difference between two different samples of the d-q component voltage. A dIq column 286 lists, for each of the states in the description column 284, the sign of the change in a d-q component current as determined by the difference between two different samples of the d-q component current. A dPq column 288 lists, for each of the states in the description column 284, the sign of the change in the d-q power component as determined by the product of dVq and dIq. An under-voltage detection column 290 lists, for each of the states in the description column 282, a fault condition detection state as determined by comparing the d-q component voltage with an under-voltage limit level value. If no fault condition is present, then the under-voltage detection state is FALSE whereas if a fault condition is present then the under-voltage detection state is TRUE. A result column 292 lists a possible result to the conditions described in the description column 282.

A load applied to a system will cause a reduction in the phase voltage, which generates a dVq having a negative value, while causing the phase current to increase, which generates a positive dIq value. The product of the negative dVq and the positive dIq is a negative dPq. A load applied will not typically result in an under-voltage detection so the detection state should be FALSE and the source and load remain connected. Accordingly, removing load from the system generates a positive dVq and a negative dIq, which also results in a negative dPq. Again the under-voltage detection state should be FALSE and thus the source and load remain connected.

In the case where a utility or other source is removed from the system, the phase voltage and current both decrease, which causes negative dVq and dIq values. The resulting dPq value is positive and the under-voltage detection state is TRUE. Since the utility or source is removed or unavailable, the source is disconnected to allow the load to be fed by a back-up power supply or other parallel sources. A source fault, such as a short circuit condition near the source, can also produce results similar to the removal of the utility. Accordingly, the result is that the source is disconnected for the same reasons. In the case of a load fault, the phase voltage decreases and the current increases, which results in a negative dPq value. Since the fault is at the load, the source remains connected to allow the load fault to be cleared through, for example, breaker reclosures.

Figure 8:
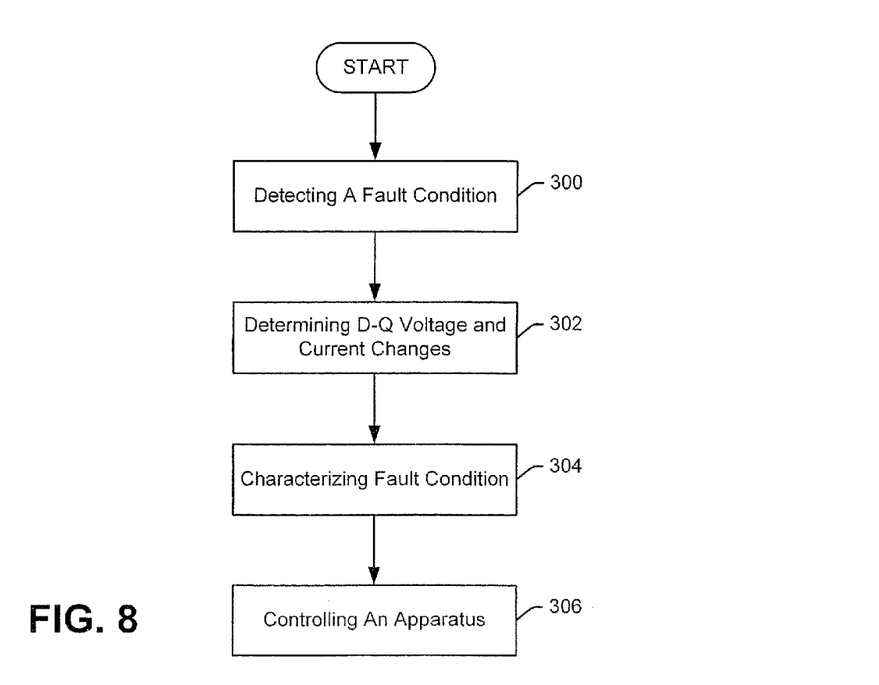
FIG. 8 is a block diagram illustrating operations according to various embodiments of the invention.

Reference is now made to FIG. 8, which is a block diagram illustrating operations according to various embodiments of the invention. Operations according to exemplary methods/apparatus herein can include detecting a fault condition (block 300). The fault condition in an electrical power system can be detected by generating a d-q voltage value from system phase voltage values and comparing the d-q voltage value to an under-voltage limit value. In this manner, if the d-q voltage value is less than the under-voltage limit value a fault condition is detected.

Operations can also include determining d-q component voltage and current changes (block 302). Determining d-q component voltage and current changes can include performing a Park's transformation on phase voltage and current values to generate a d-q component voltage and a d-q component current, respectively. The d-q component voltage and current values can be filtered to generate changes in the d-q component voltage and the d-q component current, respectively. Filtering the d-q component voltage value can include generating a first d-q voltage corresponding to a first point in time and a second d-q voltage corresponding to a second point in time and subtracting the first d-q voltage value from the second d-q voltage value. Similarly, filtering the d-q component current value can include generating a first d-q current corresponding to the first point in time and a second d-q current corresponding to the second point in time and subtracting the first d-q current value from the second d-q current value.

A fault condition can be characterized using the d-q voltage and current changes (block 304). The characterizing can include generating a delta d-q power value, the sign of which can be indicative of the direction of the change in power flow. The delta d-q power value can be generated as the product of the d-q component voltage change and the d-q component current change. In this manner, if the d-q delta power is negative then the change in power flow is directed towards the load. In the case of a detected fault condition, this would indicate that the fault condition is on the load side of the system. Alternatively, if the d-q delta power is positive then the change in power flow is directed towards the source, which, in the case of a fault, indicates a loss of source or a fault condition on the source side of the system.

An apparatus can be controlled based on the characterization of a fault condition (block 306). For example, a UPS can cause the source to be disconnected in the case of a fault condition on the source side of the system and revert to a stand-by and/or back-up power source. Additionally, parallel inverter circuits can be controlled such that if one of the inverters experiences a source fault condition, it will be disconnected while the other inverters remain connected to the load. Still yet, an electrical switching device may be controlled to change states responsive to a specific characteristic of a fault condition.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. An apparatus, comprising:
a d-q component transformer configured to generate a d-q voltage value from a plurality of phase voltage signals corresponding to phase voltages in a power system and to generate a d-q current value from a plurality of phase current signals corresponding to phase currents in the power system;
a first voltage filter configured to generate a first voltage sample from the d-q voltage value, the first voltage sample corresponding to the d-q voltage value at a first point in time;
a second voltage filter configured to generate a second voltage sample from the d-q voltage value, wherein the second voltage sample corresponds to the d-q voltage value at a second point in time that precedes the first point in time;
a first current filter configured to generate a first current sample from the d-q current value, the first current sample corresponding to the d-q current value at the first point in time;
a second current filter configured to generate a second current sample from the d-q current value, wherein the second current sample corresponds to the d-q current value at the second point in time;
a power value generator configured to generate a delta d-q power value from the first and second voltage samples and the first and second current samples;
a fault detector configured to detect a fault condition in a power system by comparing the d-q voltage value to an under-voltage limit value;
a characterizer circuit configured to determine a characteristic of the fault condition responsive to the delta d-q power value; and
a control circuit configured to control a power system component responsive to the characteristic of the fault condition.

2. The apparatus of claim 1, wherein the power system component comprises an uninterruptible power supply (UPS), wherein the control circuit disconnects a power source when the fault condition is on a source side of the apparatus, and wherein the control circuit does not react when the fault condition is on a load side of the apparatus.

3. The apparatus of claim 1, wherein the characterizer circuit determines a direction of a change in power flow based on the sign of the delta d-q power value, and
wherein the direction of a change in power flow determines whether the fault condition is on a load side of the apparatus or on a source side of the apparatus.

4. A method, comprising:
detecting a fault condition in an electrical system;
determining changes in d-q component voltage and current temporally corresponding to the detected fault condition;
characterizing the fault condition responsive to the determined changes via a d-q delta power value that is generated using the changes in d-q component voltage and current; and
controlling an apparatus based on characterizing the fault condition.

5. The method of claim 4, wherein the apparatus comprises an uninterruptible power supply configured to run in a default bypass mode, and wherein controlling comprises disconnecting a power source and powering a load using inverters when the fault condition is on a power source side of the apparatus and staying in bypass mode when the fault condition is on the load side of the apparatus.

6. The method of claim 4, wherein the apparatus comprises a plurality of inverter circuits coupled in parallel to an electrical bus, and wherein controlling comprises disconnecting one of the plurality of inverters from a load when the fault condition is on the inverter side of the electrical bus.

7. The method of claim 4, wherein the apparatus comprises an electrical switching device, and wherein controlling comprises changing the state of the electrical switching device responsive to a characteristic of the fault condition.

8. The method of claim 4, wherein determining changes in d-q component voltage and current comprise:
performing a Park's transformation on the phase voltage values to generate the d-q component voltage;
performing a Park's transformation on the phase current values to generate the d-q component current;
filtering the d-q component voltage value to generate the change in the d-q component voltage; and
filtering the d-q component current value to generate the change in the d-q component current.

9. The method of claim 8, wherein filtering the d-q component voltage value comprises generating a first d-q voltage value corresponding to a first point in time, generating a second d-q voltage value corresponding to a second point in time and subtracting the first d-q voltage value from the second d-q voltage value, and
wherein filtering the d-q component current value comprises generating a first d-q current value corresponding to the first point in time, generating a second d-q current value corresponding to the second point in time and subtracting the first d-q current value from the second d-q current value.

10. The method of claim 4, wherein characterizing the fault condition comprises generating the delta d-q power value as the product of the changes in d-q component voltage and current, wherein if the delta d-q power value is negative then the fault condition is characterized as a load fault and if the delta d-q power value is positive then the fault condition is characterized as a power source fault.

11. The method of claim 4, wherein detecting a fault condition in an electrical system comprises:
generating a d-q voltage value from phase voltage values;
comparing the d-q voltage value to an under-voltage limit value, wherein if the d-q voltage value is less than the under-voltage limit value, a fault condition is detected.

12. An apparatus, comprising:
a fault condition detector configured to detect a fault condition in an electrical system;
a delta d-q power value generator configured to generate a delta d-q power value temporally corresponding to the detected fault condition and generated using the changes in d-q component voltage and current; and
a characterizer circuit configured to characterize the fault condition relative to the apparatus responsive to the delta d-q power value.

13. The apparatus of claim 12, further comprising a controller configured to control an electrical system device responsive to the character of the fault condition.

14. The apparatus of claim 13, wherein the electrical system device comprises an uninterruptible power supply, and wherein the controller is further configured to change a power source responsive to the fault condition in a first direction in the electrical system relative of the apparatus and to maintain the power source responsive to the fault condition in a second direction in the electrical system relative of the apparatus.

15. The apparatus of claim 13, wherein the electrical system device comprises a plurality of inverter circuits coupled in parallel to an electrical bus, and wherein the controller is further configured to disconnect one of the plurality of inverters from a load when the fault condition is on the inverter side of the electrical bus.

16. The apparatus of claim 12, wherein the delta d-q power value generator comprises:
   a variable generator configured to generate respective d-q component voltage and current from phase voltage and current values; and
   a delta circuit configured to generate a delta d-q voltage and a delta d-q current, wherein the delta d-q power value is the product of the delta d-q voltage and the delta d-q current.

17. The apparatus of claim 16, further comprising means for filtering d-q voltage and current values.

18. The apparatus of claim 12, wherein the characterizer circuit is configured to determine that the fault condition is on a power source side of the apparatus if the delta d-q power value is positive and that the fault condition is on a load side of the apparatus if the delta d-q power value is negative.

19. The apparatus of claim 17, wherein the fault condition on the power source side comprises a loss of power source.

20. The apparatus of claim 12, wherein the fault condition detector comprises:
   a variable generator configured to generate a d-q component voltage from phase voltage values; and
   a comparator configured to compare the d-q component voltage to an under-voltage limit value, wherein if the d-q component voltage is less than the under-voltage limit value, a fault condition is detected.

* * * * *